US007696895B2

United States Patent
Harwood

(10) Patent No.: US 7,696,895 B2
(45) Date of Patent: *Apr. 13, 2010

(54) PATHWAY INDICATING LUMINAIRE

(76) Inventor: Ronald Paul Harwood, 31110 Applewood, Farmington Hills, MI (US) 48331

( * ) Notice: Subject to any disclaimer, the term of this patent is extended or adjusted under 35 U.S.C. 154(b) by 86 days.

This patent is subject to a terminal disclaimer.

(21) Appl. No.: 11/701,255

(22) Filed: Feb. 1, 2007

(65) Prior Publication Data

US 2007/0132604 A1 Jun. 14, 2007

Related U.S. Application Data

(63) Continuation of application No. 10/920,007, filed on Aug. 17, 2004, now Pat. No. 7,242,313, which is a continuation-in-part of application No. 10/202,746, filed on Jul. 25, 2002, now Pat. No. 6,778,093.

(60) Provisional application No. 60/307,947, filed on Jul. 26, 2001.

(51) Int. Cl.
   *G08B 23/00* (2006.01)
(52) U.S. Cl. .............. 340/693.2; 307/86; 315/159; 340/693.5; 340/815.45; 362/183; 362/296

(58) Field of Classification Search ............ 340/815.45, 340/691.1, 332, 693.5, 600, 693.2, 691.4; 362/800, 145, 20, 802, 227, 249, 276; 315/149, 315/152–154
See application file for complete search history.

(56) References Cited

U.S. PATENT DOCUMENTS

| 4,894,601 | A | * | 1/1990 | Watkins | 362/276 |
| 5,823,655 | A | * | 10/1998 | Brooks | 362/145 |
| 6,454,209 | B1 | * | 9/2002 | Bock et al. | 362/459 |
| 6,859,145 | B2 | * | 2/2005 | Wilker et al. | 340/693.5 |
| 2004/0062055 | A1 | * | 4/2004 | Rozenberg et al. | 362/555 |
| 2004/0105264 | A1 | * | 6/2004 | Spero | 362/276 |

FOREIGN PATENT DOCUMENTS

JP    2003123505 A  *  4/2003

* cited by examiner

*Primary Examiner*—Thomas J Mullen
(74) *Attorney, Agent, or Firm*—Brooks Kushman P.C.

(57) ABSTRACT

An pathway indicating luminaire for use in an auxiliary lighting system contains at least one source of primary light and at least one light emitting diode. A switching system provides energy from a storage cell to the light emitting diode upon certain conditions, generally by time or by lack of ambient light.

19 Claims, 3 Drawing Sheets

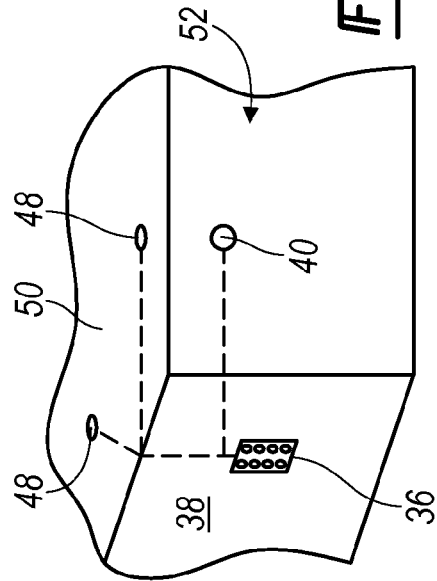
*Fig-9*
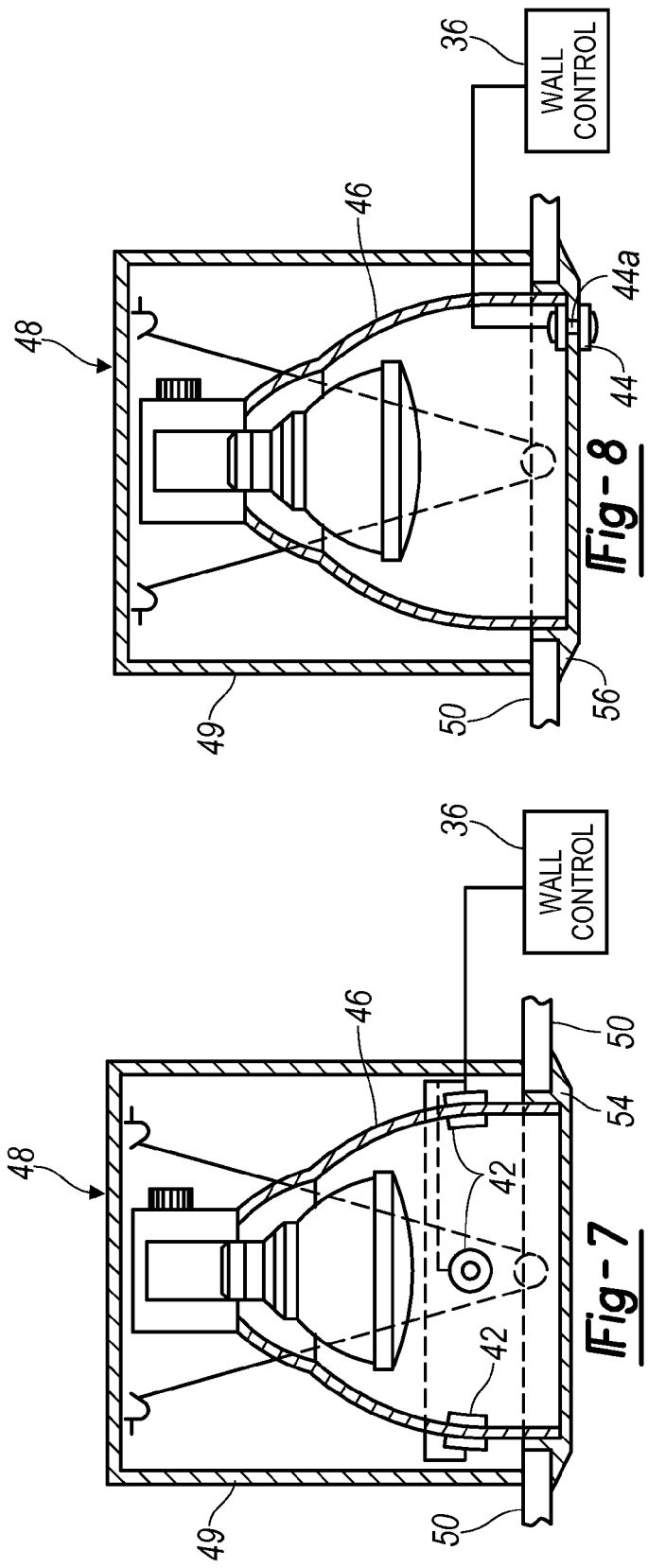
*Fig-8*
*Fig-7*

PATHWAY INDICATING LUMINAIRE

RELATED APPLICATIONS

The present application is a continuation of application Ser. No. 10/920,007, filed Aug. 17, 2004, now U.S. Pat. No. 7,242,313 B2, which is a continuation-in-part of application Ser. No. 10/202,746, filed Jul. 25, 2002, now U.S. Pat. No. 6,778,093 B2. application Ser. Nos. 10/920,007 & 10/202,746 are incorporated herein by reference in their entirety. The benefit of said applications, Ser. Nos. 10/920,007 & 10/202,746, is claimed under 35 U.S.C. §120.

U.S. patent application Ser. No. 10/202,746 claimed the benefit, under 35 U.S.C. §119(e), of the provisional application filed Jul. 26, 2001 under 35 U.S.C. §111(b), which was granted Ser. No. 60/307,947. The provisional application, 60/307,947, is hereby incorporated by reference herein in its entirety.

FIELD OF THE INVENTION

The present invention relates to an improved system for providing pathway indication through unlit areas. For example, outdoor parking lots are often illuminated by light poles, which for economic reasons, are often designed to be automatically turned off after a set time, for example at midnight. After this shut off time, navigating or exiting the parking lot can be extremely hazardous. In fact, the light poles themselves can be a significant obstacle to safe egress of the parking lot.

A similar situation can exist in interior areas of residences and buildings, whether for economic or other reasons. After the interior lights of a building are shut off, for whatever reason, navigating of the building's interior, or exiting the building can be hazardous.

SUMMARY OF RELATED ART

U.S. Pat. No. 4,801,928 discloses an egress direction indication system utilizing an indicator with at least three electroluminescent lamps in a linear arrangement and circuitry for sequentially illuminating the lamps on a repeating basis, in order, from one end of the linear arrangement to the other. The lamps are mounted on a circuit board with a lens covering the lamps. The circuitry lights in a first direction under one sensed condition and lights in a second direction in a different sensed condition.

U.S. Pat. No. 5,815,068 discloses a light system with controllable light sources positioned along alternative routes of movement to serve as an optical means for influencing people to follow an indicated route to a selected area. A command system allows a selection to be made controlling the direction of movement to be indicated. Light emitting diodes (LEDs) are a preferred light source.

U.S. Pat. No. 5,343,375 discloses an emergency egress illuminator and marking light strip. This patent teaches a system for the lighting of a floor of an emergency egress passageway during clear air conditions and also marks an emergency escape path. The system utilizes two narrow strings of narrow cone LEDs each in a transparent tubular housing, which is mounted on the passageway wall.

While these systems are suitable for their intended purposes, they are not ideally designed for applications such as described above. This is because the present invention provides improved energy efficiency over the systems known in the art, and is thus more economical. Additionally, the present invention is optimized to operate in conditions of power failure or other interruptions of main power supply.

Therefore, it is an object of the present invention to provide an economical lighting system to allow safe egress from a darkened area, such as a building interior or parking lot, when a primary light system is unavailable.

SUMMARY OF THE INVENTION

In accordance with the present invention, there is provided a photocell for converting sunlight into electrical energy and a storage cell for storing that energy for a future time. The photocell and the storage cell may be combined into the same unit, but this is not necessary. The storage device is connected, by way of a switching apparatus, to an LED or series of LEDs, which provide sufficient light to illuminate the darkened area sufficiently to allow safe egress from the darkened area. A control panel may be provided to allow the operator of the facility in which the invention is installed to turn the system on or off, and/or choose between various modes of operation.

BRIEF DESCRIPTION OF THE DRAWINGS

The above, as well as other advantages of the present invention, will become readily apparent to those skilled in the art from the following detailed description when considered in light of the accompanying drawings in which:

FIG. 7 is an elevational, sectional, view of a luminaire, which embodies a further modification of the present invention.

FIG. 8 is a view, similar in part to FIG. 7, but showing a further modification of the present invention.

FIG. 9 is a perspective view, partially broken away, showing how a control panel may be used in the construction of the present invention.

DETAILED DESCRIPTION OF THE REFERRED EMBODIMENT

Figure 1:
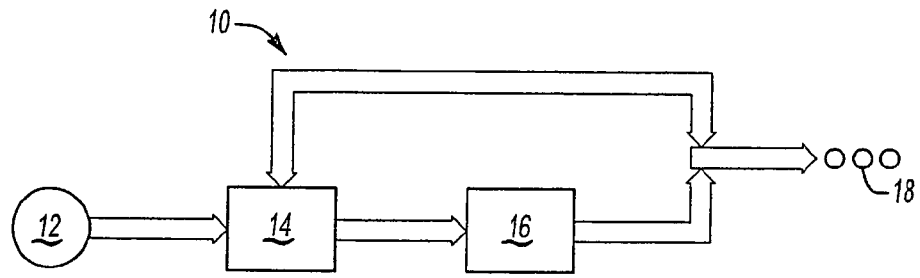
FIG. 1 illustrates a schematic diagram of an electrical system in accordance with the present invention.

FIG. 1 illustrates an auxiliary lighting system 10 according to the present invention. The auxiliary lighting system 10 includes a photoelectric collector 12 positioned in such a manner as to receive a maximal amount of sunlight. If the auxiliary lighting system is to be used indoors, the collector could be placed indoors, in a place where it will be exposed to light, or it can be placed outdoors. The photoelectric collector 12 is then connected to an auto-switching energy sensor 14. The sensor 14 is then connected to one or more electrical storage devices 16. The storage devices 16 can then be connected to one or more LEDs 18 as the light source of the auxiliary lighting system 10. The sensor 14 can also provide an additional electric pathway directly from the photoelectric collector 12 to the LEDs 18.

Figure 2:
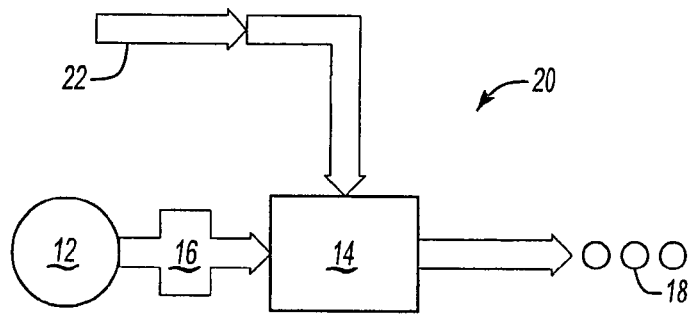
FIG. 2 illustrates a schematic diagram of an alternative electrical system in accordance with the present invention.

FIG. 2 illustrates a modification of the present invention, shown as the auxiliary lighting system 20. In this embodiment, the photoelectric collector 12 is connected to the energy storage device 16. The energy storage device 16 is then connected to the sensor 14. The sensor 14 is also connected to a primary power source 22. Finally, the sensor provides an electrical connection to the LEDs 18. In this embodiment, the sensor can switch the LEDs 18 between the main source of outside power 22 and the auxiliary source, the storage device 16. This could be done, for example, after the main power source 22 is switched off for the night, or upon a failure of the main power source 22. In an alternative not shown in this figure, the main power source 22 could be connected to a different light source, specifically one generating more light than the LEDs 18.

Thus when the sensor 14 sees that main power is on, the main lights are turned on, and when main power is turned off, for example by timer or upon an interruption in main power, the stored power 16 is then connected via the switch 14 to the LEDs 18.

Figure 3:
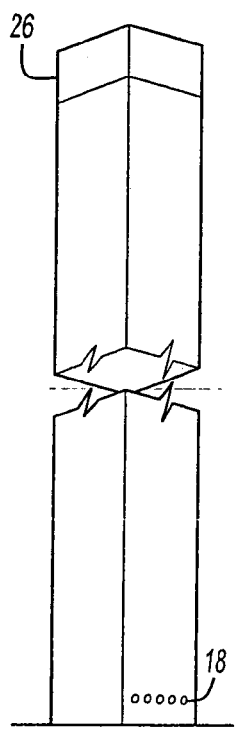
FIG. 3 illustrates a light pole utilizing the present invention.

FIG. 3 illustrates an embodiment of the present invention as utilized in a light pole 24 for a parking lot. The light pole 24 has a main lighting source 26, and additionally has LEDs 18, located near the bottom of the pole. The LEDs 18 can be connected to a photoelectric collector and switch (see FIG. 2) and can be turned on when the main light source 26 is disengaged. The location of the LEDs 18 near the bottom of the light pole 24 is suitable to allow individuals to see the location of the pole 24 in the darkened parking lot.

Figure 4:
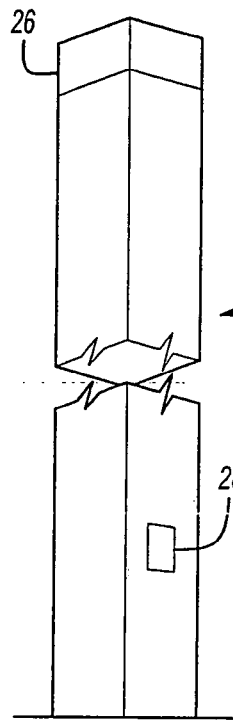
FIG. 4 illustrates a light pole utilizing an alternative embodiment of the present invention.
Figure 5:
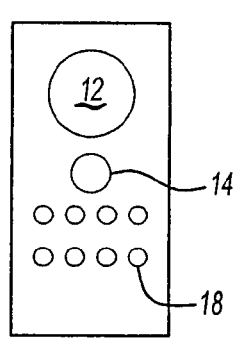
FIG. 5 illustrates an enlarged view of a self-contained unit shown in the light pole in FIG. 4.

FIG. 4 illustrates a variation of the embodiment shown in FIG. 3. In FIG. 4, the auxiliary lighting unit is maintained as a separate system 28 (see FIG. 5), which is inserted into a recess in the light pole. The system 28 can be originally designed into the light pole 24 or can be retrofitted into it subsequent to the pole's initial construction. The system includes the photoelectric collector 12 along with a sensor 14 and LEDs 18. The sensor can work as described above, either by time, lack of main power, or additionally, by sensing the level of ambient light, and turning on the LEDs only when the ambient light is low enough to indicate that the primary light 26 is inactive. This would provide illumination at times when the main light 26 should be engaged but is not, for example upon burnout of the main light bulb.

While exterior applications of the lighting system are described above, further applications are envisioned, both exterior and interior. The present invention is suitable for use anywhere an auxiliary lighting system is necessary. Because of its use of lower energy using LEDs and stored solar power, the system is extremely economical compared to known auxiliary or emergency lighting systems.

Figure 6:
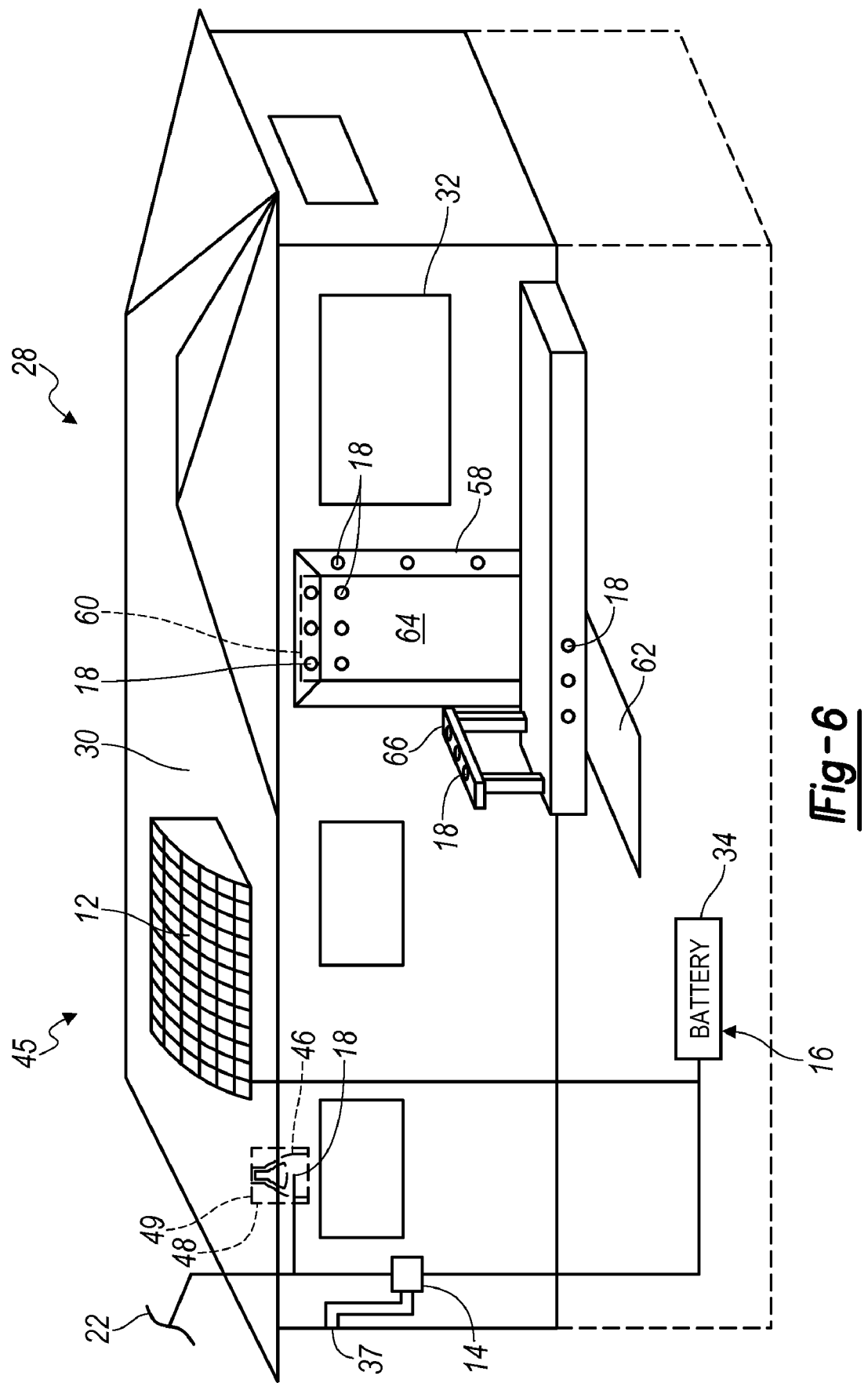
FIG. 6 is a schematic view showing a construction embodying a further modification of the present invention.

For example, referring to FIG. 6, auxiliary lighting system 20 is shown advantageously being used to light the interior of a building 28. Photoelectric collector 12 is shown mounted to the roof 30 of the building 28. Alternately, photoelectric collector 12 could be mounted in the interior of the building 28 anyplace where it would receive sufficient sunlight during daylight hours, such as near a window 32.

The photoelectric collector 12 is electrically connected to an energy storage device 16, such as battery 34. Battery 34 can be mounted at any convenient location in the building 28.

The energy storage device 16 is then electrically connected to the energy sensor 14. The energy sensor is also connected to a primary power source 22. Finally, the energy sensor 14 provides an electrical connection to the LEDs 18, one such LED 18 being shown mounted to reflector 46 of luminaire 48, having housing 49, as shown in FIG. 6. A control panel 36 (FIG. 9) may be provided on an interior wall 38 of the building 28 to provide for operator selection of various modes of operation of the system 20, as is explained hereinafter, or to turn the system off completely, if desired. The LEDs 18 are electrically connected to the energy sensor 14 and/or the control panel 36, depending on the application.

Remote photocell 37 may be provided on the exterior or interior of the building structure 28 to provide an indication of ambient or exterior or interior lighting conditions when needed for a particular application.

In this modification of the present invention, the LEDs 18 take the form of wall mounted LEDs 40, reflector mounted LEDs 42, or bezel or trim ring mounted LEDs 44. Some or all of LEDs (40, 42, 44) may be combined to form interior auxiliary lighting system 45. The invention contemplates taking any lighting fixture currently manufactured, or yet to be designed and manufactured, whether recessed, or surface mounted, and adding LEDs to the reflectors, housings, trim rings, or bezels. These LEDs will be powered by the energy storage device 16 and the photoelectric collector, and controlled through various arrangements of switches, photocells and relays of the type well known in the art.

Referring to FIG. 7, there is shown a plurality of reflector mounted LEDs 42 mounted to the reflector 46 of luminaire 48. While several reflector mounted LEDs 42 are shown mounted to reflector 46, any practical number could be used, depending on the application. The luminaire 48 is mounted, by ways well known in the lighting and construction arts, to the ceiling 50 of a room 52 in the building 28. A standard bezel or trim ring 54 is used to close the gap between the ceiling 50 and the reflector 46.

Referring to FIG. 8, a modification of the invention is shown. While a standard luminaire 48 is provided, a modified bezel or trim ring 56 is utilized. Aperture(s) 44A are provided for mounting one or more bezel or trim ring mounted LEDs 44 to the modified bezel or trim ring 56. While the modification shown in FIG. 7 takes advantage of the reflector 46 of the luminaire 48, and may require a smaller LED and/or give a softer lighting effect, in applications requiring more distinct or brighter illumination, the modification shown in FIG. 8 may be preferred.

While the use of LEDs (18, 40, 42, 44) in recessed lighting has been shown, the use of LEDs in surface or suspended illumination is well within the scope of the present invention. Also, the use of LEDs powered by the invention installed or molded into moldings 58 (FIG. 6), channels 60, or other linear or non-linear materials for use in defining paths 62, doors 64, objects, handrails 66, etc. is contemplated. Wherever the LEDs are used, they will be electrically connected to the photoelectric collector 12 and the electrical storage device(s) 16, and will be connected between the two by the energy sensor 14. By use of the control panel 36, the operator may choose to have the system on or off, and, if desired, may have the option to have any or all of the LEDs (18, 40, 42, 44) electrically connected at any desired time. The knowledge to provide and wire such a control panel 36 is well within the knowledge of those skilled in the art, and need not be described in detail herein.

In some applications, wall mounted LEDs 40 may be used (FIG. 9). Wall mounted LED 40 illumination is believed to be particularly advantageous in interior applications such as nighttime illumination for hallways, bathrooms, garages, bedrooms, and all entrances and egresses.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed:

1. An auxiliary lighting system comprising:
   a photoelectric collector to convert light to electric energy;
   at least one storage device electrically connected to the photoelectric collector to store energy produced by the photoelectric collector;
   at least one light emitting diode to provide illumination to an area; and
   at least one switching device electrically connected to the storage device and a source of primary power to selectively control the provision of electricity from the at least one storage device and the source of primary power to said at least one light emitting diode, the light emitting diode being electrically connected to the at least one switching device;
   wherein the at least one light emitting diode is a reflector mounted light emitting diode.

2. The auxiliary lighting system of claim 1, further comprising a luminaire, comprising:
   a) a housing;
   b) a reflector having an upper portion, concave reflective surfaces, and a lower peripheral edge, mounted in the housing; and
   c) a main light source mounted proximate the upper portion of the reflector for conveying light to reflect from the reflector and out of the housing to provide illumination to the area;
   wherein the at least one light emitting diode is mounted to or on said reflector proximate the lower peripheral edge to provide illumination to the area; and
   wherein the at least one switching device further comprises a sensor for sensing a level of ambient light or for sensing a level of the source of primary power provided for the main light source, the sensor being connected to the at least one light emitting diode, the sensor being connected to one of the source of primary power and an auxiliary source of power, and the sensor being connected to the at least one light emitting diode to selectively control the provision of electricity from the one of the source of primary power and the auxiliary source of power to the at least one light emitting diode in response to a low level of ambient light or a lack of power to the main light source.

3. The auxiliary lighting system of claim 2, further comprising a standard trim ring or bezel.

4. The lighting system of claim 1, wherein the reflector mounted light emitting diode is mounted in or to the reflector of a luminaire.

5. The lighting system of claim 1, further comprising:
   a housing; and
   a reflector having concave reflective surfaces and a lower peripheral edge mounted in the housing;
   wherein the reflector mounted light emitting diode is mounted to or on said reflector proximate the lower edge.

6. A luminaire comprising:
   a) a housing;
   b) a reflector having concave reflective surfaces and a lower peripheral edge mounted in the housing;
   c) a primary light source provided within the housing for conveying light to reflect from the reflector and out of the housing; and
   d) at least one reflector mounted light emitting diode mounted to or on said reflector on a substantially upright portion of the reflector and oriented to convey light centrally and downward out of the housing.

7. The luminaire of claim 6, further comprising e) a standard trim ring or bezel.

8. An auxiliary lighting system comprising:
   a photoelectric collector to convert light to electric energy;
   at least one storage device electrically connected to the photoelectric collector to store energy produced by the photoelectric collector;
   at least one light emitting diode to provide illumination to an area; and
   at least one switching device electrically connected to the storage device and a source of primary power to selectively control the provision of electricity from the at least one storage device and the source of primary power to said at least one light emitting diode, the light emitting diode being electrically connected to the at least one switching device;
   wherein the at least one light emitting diode is a bezel mounted light emitting diode.

9. The auxiliary lighting system of claim 8, further comprising a luminaire, comprising:
   a) a housing;
   b) a reflector having a upper portion, concave reflective surfaces, and a lower peripheral edge, mounted in the housing;
   c) a main light source mounted proximate the upper portion of the reflector for conveying light to reflect from the reflector and out of the housing to provide illumination to the area; and
   d) a bezel;
   wherein the at least one light emitting diode is mounted to the bezel to provide illumination to the area; and
   wherein the at least one switching device further comprises a sensor for sensing a level of ambient light or for sensing a level of the source of primary power provided for the main light source, the sensor being connected to the at least one light emitting diode, the sensor being connected to one of the source of primary power and an auxiliary source of power, and the sensor being connected to the at least one light emitting diode to selectively control the provision of electricity from the one of the source of primary power and the auxiliary source of power to the at least one light emitting diode in response to a low level of ambient light or a lack of power to the main light source.

10. The lighting system of claim 8, wherein the bezel mounted light emitting diode is mounted in or to a bezel of a luminaire.

11. The lighting system of claim 8, further comprising:
    a housing;
    a reflector mounted in said housing; and
    a modified bezel;
    wherein the bezel mounted light emitting diode is mounted to the modified bezel.

12. An auxiliary lighting system comprising:
    a photoelectric collector to convert light to electric energy;
    at least one storage device electrically connected to the photoelectric collector to store energy produced by the photoelectric collector;
    at least one light emitting diode to provide illumination to an area; and
    at least one switching device electrically connected to the storage device and a source of primary power to selectively control the provision of electricity from the at least one storage device and the source of primary power to said at least one light emitting diode, the light emitting diode being electrically connected to the at least one switching device;

wherein the at least one light emitting diode is a trim ring mounted light emitting diode.

13. The lighting system of claim 12, further comprising a modified trim ring wherein the trim ring mounted light emitting diode is mounted to the modified trim ring.

14. A lighting system comprising:
a luminaire having a primary light source for conveying light to provide illumination to an area;
a wall mounted light emitting diode;
a control panel which is electrically connected to the wall mounted light emitting diode and the luminaire; and
a sensor for sensing a level of ambient light or for sensing a level of a main source of power provided for the primary light source, the sensor being connected to one of the main source of power and an auxiliary source of power, and the sensor being connected to the wall mounted light emitting diode to selectively control the provision of electricity from the one of the main source of power and the auxiliary source of power to the wall mounted light emitting diode in response to a low level of ambient light.

15. A lighting system comprising:
a luminaire having a primary light source for conveying light to provide illumination to an area;
a channel mounted light emitting diode;
a control panel which is electrically connected to the channel mounted light emitting diode and the luminaire; and
a sensor for sensing a level of ambient light or for sensing a level of a main source of power provided for the primary light source, the sensor being connected to one of the main source of power and an auxiliary source of power, and the sensor being connected to the channel mounted light emitting diode to selectively control the provision of electricity from the one of the main source of power and the auxiliary source of power to the channel mounted light emitting diode in response to a low level of ambient light.

16. A lighting system comprising:
a luminaire having a primary light source for conveying light to provide illumination to an area;
a moulding mounted light emitting diode;
a control panel which is electrically connected to the moulding mounted light emitting diode and the luminaire; and
a sensor for sensing a level of ambient light or for sensing a level of a main source of power provided for the primary light source, the sensor being connected to one of the main source of power and an auxiliary source of power, and the sensor being connected to the moulding mounted light emitting diode to selectively control the provision of electricity from the one of the main source of power and the auxiliary source of power to the moulding mounted light emitting diode in response to a low level of ambient light.

17. A lighting system comprising:
a luminaire having a primary light source for conveying light to provide illumination to an area;
a door mounted light emitting diode;
a control panel which is electrically connected to the door mounted light emitting diode and the luminaire; and
a sensor for sensing a level of ambient light or for sensing a level of a main source of power provided for the primary light source, the sensor being connected to one of the main source of power and an auxiliary source of power, and the sensor being connected to the door mounted light emitting diode to selectively control the provision of electricity from the one of the main source of power and the auxiliary source of power to the door mounted light emitting diode in response to a low level of ambient light.

18. A lighting system comprising:
a luminaire having a primary light source for conveying light to provide illumination to an area;
a handrail mounted light emitting diode;
a control panel which is electrically connected to the handrail mounted light emitting diode and the luminaire; and
a sensor for sensing a level of ambient light or for sensing a level of a main source of power provided for the primary light source, the sensor being connected to one of the main source of power and an auxiliary source of power, and the sensor being connected to the handrail mounted light emitting diode to selectively control the provision of electricity from the one of the main source of power and the auxiliary source of power to the handrail mounted light emitting diode in response to a low level of ambient light.

19. A lighting system comprising:
a luminaire having a primary light source for conveying light to provide illumination to an area;
a series of pathway illuminating light emitting diodes;
a control panel which is electrically connected to the series of pathway illuminating light emitting diodes and the luminaire; and
a sensor for sensing a level of ambient light or for sensing a level of a main source of power provided for the primary light source, the sensor being connected to one of the main source of power and an auxiliary source of power, and the sensor being connected to the series of pathway illuminating light emitting diodes to selectively control the provision of electricity from the one of the main source of power and the auxiliary source of power to the series of pathway illuminating light emitting diodes in response to a low level of ambient light.

* * * * *